Patented June 6, 1939

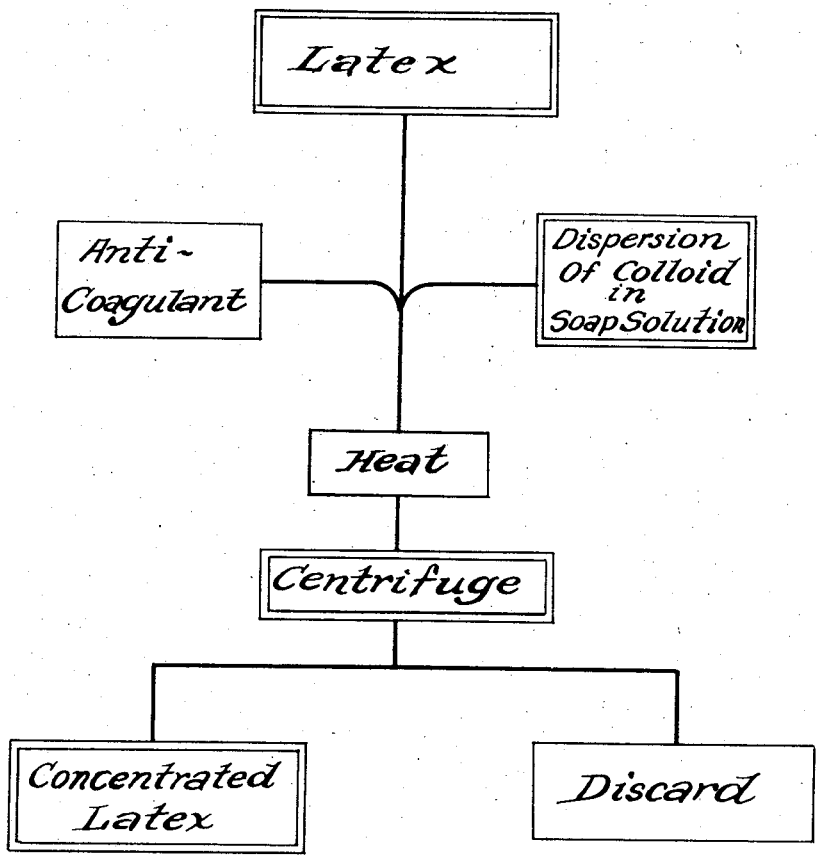

UNITED STATES PATENT OFFICE 2,161,731

PROCESS FOR PREPARING A CONCENTRATED RUBBER DISPERSION FROM LATEX AND PRODUCT

Nicolaas Hendrik van Harpen, Medan, Sumatra, Netherlands East Indies, assignor to Algemeene Vereeniging Van Rubberplanters Ter Oostkust Van Sumatra, Sumatra, Netherlands East Indies Application May 3, 1937, Serial No. 140,564
In the Netherlands April 10, 1937

6 Claims. (Cl. 18—50)

This invention relates to improvements in the process for preparing a concentrated rubber dispersion from latex and to the product thereof.

It is already known that a rubber dispersion such as the latex from rubber trees, e. g. *Hevea brasiliensis*, *Ficus elastica*, etc., can be separated into two layers by means of centrifugal action, the upper layer containing more, the lower layer containing less rubber than the original latex. The first layer is called rubber cream, the latter is called underlatex. The latter aqueous solution contains most of the non-rubber substances, such as salts and albumens.

It is known that the effect of this separation can be increased by adding a small quantity of a soap solution to the latex.

Also it is known from U. S. Patent No. 1,754,535 to increase the effect of the centrifugal action by adding colloids to the latex.

Surprisingly various, very important improvements of the centrifugal effect are obtained if before centrifuging the latex is mixed with a dispersion of one or more colloids in a soap solution. The obtained results are greater than might be obtained by adding the similar results, obtained by each of the components.

While putting into practice the new process, if desired, the known addition of anti-coagulants may be used, this addition increasing the stability of the material to start with and of the final product, that is to say prevents coagulation.

As soaps for preparing the soap solution may be mentioned those of the kind of ammonium, potassium or sodium salts of saturated or unsaturated fatty acids or of cyclic carbon- or oxicarbon-acids, amenoacids or oxiamenoacids with aliphatic or aromatic radicals, such as laurinic, oleinic, margarinic, stearinic, palmitinic, amenocaprylic, oxiamenopelargonic, amenooxiphenyl-propionic acid.

The colloids are preferably of organic origin but may also be of inorganic character. They only partially belong to the group of the s. c. creaming agents and either may be of vegetable or animal origin or synthetically obtained. They are materials with a high molecular weight.

As examples of organic colloids may be mentioned: casein, haemoglobin, polysaccharides, xylane, pentosane, mannane, galactane, levulane, celluloses and hemicelluloses, boneglue, gelatine, pectin, saleb, agar-agar, amorphophallus flour, cassiaseed flour, ceasalpiniaseed extract, starch, Iceland moss, carraghene, alginates, tragacanth, arabic gum, linseedgum, diagum, mastix, viscose, cellulose-ethers, polymers of the homologues of polyacrylic acids and their alkali or ammonium salts, latekool.

As examples of inorganic colloids may be mentioned the oxides, hydroxides, basic oxides, hydrocarbonates, chlorides, thiosulphates, borates, acetates, oxalates and lactates of lead, bismuth, aluminium, iron, tin and zinc. These substances can be dispersed in water with the above mentioned soaps e. g. with the aid of a colloid mill, giving viscous colloidal dispersions. This kind of inorganic dispersions is known e. g. from the United States Patent No. 1,634,124.

The colloids may be used separately or in combination with each other.

As anticoagulants may be mentioned the known substances such as ammonia, alkalihydroxides, alkaline carbonates, -phosphates, -borates, -citrates, -phenolates, alkaline salts of alkylic acids e. g. methyl-sulphuric acid, soluble aliphatic and aromatic amenes, alkaline sulphites, selenites or tellurites, formalin, separately or combined with each other.

Before centrifuging a heat treatment may be given the latex by heating between 30° C. and 100° C. or by sterilizing between 100° C. and 150° C. both with or without an anticoagulant. While centrifuging also a temperature of the latex between 30° C. and 100° C. may be applied to increase the capacity of the centrifuge and to be able to treat a bigger volume of latex in the same time with the same separating effect.

A cooling treatment to temperatures between about 25° C. and 0° C. which is already known in centrifuging processes for latex, may be also applied thus increasing its viscosity.

In two experiments the results of the new process were compared with those, obtained by the known methods. To explain the tables giving those results the following is to be mentioned.

The dry rubber content is given as a percentage of the examined liquid.

The production of liquid is given in litres per hour.

The yield of dry rubber is calculated by multiplying the product of the two first mentioned data with the specific gravity of the liquid (the specific gravity of rubber cream being 0.950 and of underlatex being 1.023).

The relative viscosity is given by a number which is obtained by dividing the outflow time of the liquid from a viscosimeter by the outflow time of water from the same viscosimeter, at the same temperature.

The relative stability against friction is measured by means of an apparatus in which the liquid is moved by an agitator rotating 4000 revolutions per minute. After a certain time the friction in the liquid suddenly diminishes because coagulated particles are formed. The time elapsed between the beginning of the agitating step and the sudden diminishing of the friction is to be considered as a measure of the stability.

All experiments were made with a centrifuge with conical plates, neither the outlet for the rubber cream, nor the outlet for the underlatex being regulable and all variable factors, being cut out.

The production of liquid, the number of revolutions and the temperature were always constant, the concentration of the latex at the beginning being also constant in each series of experiments.

First experiment

Directly after tapping the used latex was preserved with a quantity of ammonia (0.6 per cent. by weight of the latex).

One part of this latex was treated in such a way, that per 10 kg. 606 grams of a solution were added, composed of 600 grams of water and 6 grams of tragacanth, the tragacanth added being 0.06% by weight of the latex.

Per 10 kg. of a second part of this latex 650 grams of a solution was added, composed of 600 grams of water and 50 grams of ammonium stearate (soap), the soap added being 0.5% by weight of the latex.

To a third part of this latex, per 10 kg., 656 grams of a liquid was added, obtained by dissolving 50 grams of ammonium stearate in 600 grams of water and dispersing 6 grams of tragacanth in this solution.

The three final solutions contained practically the same concentration of tragacanth and also the same concentration of ammonium stearate.

Immediately after a stirring for about 5 minutes the mass was centrifuged. The centrifuge worked about 120 litres of latex per hour at 6800 revolutions per minute. The temperature was 28° C.

The results were:

Latex with 0.6% ammonia and also containing—

|  | 0.06% tragacanth | 0.5% ammonium stearate | 0.06% tragacanth dispersed in 0.5% ammonium stearate |
|---|---|---|---|
| Dry rubber content (percent) | 39.3 | 39.3 | 39.3 |
| Relative viscosity at 28° C | 1.12 | 1.15 | 1.21 |
| Relative stability at 28° C | 230 | 300 | 390 |

Cream obtained

| | | | |
|---|---|---|---|
| Dry rubber content (percent) | 60.2 | 62.3 | 64.2 |
| Production of liquid (litres per hour) | 62.1 | 55.3 | 71.6 |
| Yield of dry rubber (kg. per hour) | 35.5 | 32.7 | 43.7 |
| Relative viscosity at 28° C | 2.11 | 2.42 | 3.35 |
| Relative stability at 28° C | 280 | 350 | 510 |

Underlatex obtained

| | | | |
|---|---|---|---|
| Dry rubber content (percent) | 17.7 | 20.1 | 4.7 |
| Production of liquid (litres per hour) | 57.9 | 64.7 | 48.4 |
| Yield of dry rubber (kg. per hour) | 10.5 | 13.3 | 2.3 |
| Relative viscosity at 28° C | 1.03 | 1.04 | 1.00 |

Second experiment

The latex from another estate, directly after tapping was preserved with a quantity of potassium hydroxide (0.5% by weight of the latex) and then during 30 minutes heated at 80° C. Hereafter the mass was allowed to cool to 30° C.

One part of this latex was treated in such a manner that per 10 kg. 757.5 grams of a liquid was added, composed of 750 grams of water and 7.5 grams of linseedgum, the linseedgum added being 0.075% by weight of the latex.

To a second part of this latex per 10 kg. 810 grams of a liquid was added, composed of 750 grams of water and 60 grams of sodium-oleate, the soap added being 0.6% by weight of the latex.

To a third part of this latex per 10 kg. first 300 grams of a solution was added, containing 60 grams of soap in 240 grams of water, so that the soap percentage with regard to the latex was 0.6% as in the second case. Hereafter 517.5 grams of a solution, obtained by dispersing 7.5 grams of linseedgum in 510 grams of water was added, the mass being stirred continually; the percentage of colloid being also 0.075% by weight of the latex as in the first case.

After stirring 30 minutes a homogeneous dispersion was formed which directly was centrifuged.

The results were:

Latex heated with KOH also containing—

| | 0.075% linseedgum | 0.6% sodium-oleate | 0.075% linseedgum + 0.6% sodium-oleate |
|---|---|---|---|
| Dry rubber content (percent) | 43.7 | 43.7 | 43.7 |
| Relative viscosity at 28° C | 1.17 | 1.20 | 1.27 |
| Relative stability at 28° C | 210 | 240 | 310 |

Cream obtained

| | | | |
|---|---|---|---|
| Dry rubber content (percent) | 60.6 | 63.1 | 68.7 |
| Production of liquid (litres per hour) | 50.4 | 42.5 | 63.2 |
| Yield of dry rubber (kg. per hour) | 29.0 | 25.5 | 41.2 |
| Relative viscosity at 28° C | 2.25 | 2.65 | 7.33 |
| Relative stability at 28° C | 240 | 280 | 460 |

Underlatex obtained

| | | | |
|---|---|---|---|
| Dry rubber content (percent) | 26.9 | 29.2 | 3.7 |
| Production of liquid (litres per hour) | 49.6 | 57.5 | 36.8 |
| Yield of dry rubber (kg. per hour) | 13.6 | 17.1 | 1.4 |
| Relative viscosity at 28° C | 1.08 | 1.10 | 1.00 |

The drawing, in the form of a flow sheet, illustrates schematically the above described process.

It appears from the results of these experiments that by applying the new means, the following advantages are obtained.

1. The quantity of rubber separated in the cream increases very importantly both by the increase of the quantity of cream as by the increase of its dry rubber content. That quantity of rubber in the first experiment without application of the process of the invention amounting to an average of ½(35.5+32.7) =34.1 kg. per hour and by applying the present invention to 43.7 kg. per hour, the present invention thus giving an increase of 28%. In the second experiment the corresponding data were respectively ½(29.0+25.5) =27.2 kg. per hour and 41.2 kg.

per hour, the process of the present invention giving an increase of more than 51%.

2. The quantity of underlatex decreases importantly and also the dry rubber content thereof, so that the losses of rubber in the underlatex by both reasons are as slight as possible, even by large capacities of the centrifuges. In the first experiment the average losses of rubber in the underlatex by applying the known methods were $\frac{1}{2}(10.5+13.3)=11.9$ kg. per hour, those losses by applying the process of the present invention decreasing to 2.3 kg. per hour. In the second experiment by applying the known methods the corresponding data were $\frac{1}{2}(13.6+17.1)=15.3$ kg. per hour and by applying the new process 1.4 kg. per hour; the improvement in this case being still greater.

3. The quantity of coagulant necessary to coagulate the rubber still present in the underlatex decreases in the same way, thus saving the expenses of the coagulant acid.

4. The viscosity of the cream increases importantly. In the first experiment without applying the invention the viscosity attained an average of $\frac{1}{2}(2.11+2.42)=2.26$ and by applying the process of the invention increased to 3.35; in the second experiment the corresponding data being respectively $\frac{1}{2}(2.25+2.65)=2.45$ and 7.33.

5. The stability of the cream also increases importantly. In the first experiment without applying the invention the stability attained an average of $\frac{1}{2}(280+350)=315$, and by applying the process of the invention increased to 510. In the second experiment the corresponding data being respectively $\frac{1}{2}(240+280)=260$ and 460.

This increase of the stability means a decrease of the chance of coagulation and in the first place is very important for the centrifuging itself, the centrifuge remaining clean for a longer time thus producing a greater quantity of cream. In the second place the chance of obstruction while conveying the mass, e.g. by pumping, is diminished because of its greater stability. In the third place the increased stability tends to add larger quantities of foreign materials to the cream, such as vulcanising ingredients, vulcanising accelerators, fillers, colours, softening agents, antioxidants, etc., as are used in practice.

The stabilized concentrated cream can be converted with a smaller chance of coagulation into a stable dry rubber by evaporation or spraying.

6. Dispersing colloids in water or other dispersing agents such as e. g. glycerine, usually takes several hours because the colloids mostly need time to swell; but by applying the process of the invention it appears to be possible to prepare the dispersion in the soap solution within a few minutes, thus saving time and materials.

Eventually those dispersions may be formed in the latex but it is preferable to prepare them beforehand.

I claim:

1. The process of preparing a concentrated rubber dispersion from latex, comprising mixing the latex with a dispersion of a colloid in a soap solution, and centrifuging the mixture whereby the lighter cream layer is separated from the heavier layer of the underlatex.

2. The process of preparing a concentrated rubber dispersion from latex, comprising mixing the latex with a dispersion of colloids in a soap solution and with an anti-coagulant, and centrifuging the mixture whereby the lighter cream layer is separated from the heavier layer of the underlatex.

3. The process of preparing a concentrated rubber dispersion from latex, comprising mixing the latex with a dispersion of a colloid in a soap solution, heating the mixture, and centrifuging the mixture whereby the lighter cream layer is separated from the heavier layer of the underlatex.

4. The process of preparing a concentrated rubber dispersion from latex, comprising mixing the latex with a dispersion of a colloid in a soap solution and with an anti-coagulant, heating the mixture, and centrifuging the mixture whereby the lighter cream layer is separated from the heavier layer of the underlatex.

5. As a new product, a concentrated rubber-cream containing a colloid dispersed in a soap substance.

6. As a new product, an anti-coagulated concentrated rubber latex of a colloidal condition dispersed in a saponaceous substance with an anti-coagulant.

NICOLAAS HENDRIK van HARPEN.